United States Patent
Wurzel et al.

(10) Patent No.: US 6,835,406 B1
(45) Date of Patent: Dec. 28, 2004

(54) FROZEN FUDGE DRINK

(75) Inventors: Mark Wurzel, Brookville, NY (US); Allison Quinlan, Long Beach, NY (US)

(73) Assignee: Calico Cottage, Inc., Amityville, NY (US)

( * ) Notice: Subject to any disclaimer, the term of this patent is extended or adjusted under 35 U.S.C. 154(b) by 69 days.

(21) Appl. No.: 10/193,952

(22) Filed: Jul. 10, 2002

(51) Int. Cl.$^7$ ................................................ A23L 2/38

(52) U.S. Cl. ...................................... 426/593; 426/518

(58) Field of Search ................................ 426/631, 590, 426/565, 593, 519, 518, 569, 66, 660

(56) References Cited

U.S. PATENT DOCUMENTS

| | | | | |
|---|---|---|---|---|
| 4,906,486 A | * | 3/1990 | Young | 426/518 |
| 5,437,886 A | * | 8/1995 | Atkins et al. | 426/518 |
| 6,242,037 B1 | * | 6/2001 | Vincent | 426/590 |
| 6,326,047 B1 | * | 12/2001 | Farrell | 426/524 |

OTHER PUBLICATIONS

Weber, L. 1991 Favorite Brand name Recipes Cookbook., Publications International, p. 36.*
Anon. The Smoothie/Shake Recipes. Oct. 2000[retrieved on Jan. 28, 2001].*
Retrieved from the Internet; URL: <http//www-simply-fit-.com/best—smoothie/htm. pp. 1–12.*

* cited by examiner

Primary Examiner—Carolyn Paden
(74) Attorney, Agent, or Firm—Reed Smith LLP

(57) ABSTRACT

A frozen fudge drink is provided by first blending a plurality of fudge pieces with a relatively small predetermined amount of water to provide an intermediate product that has no significant fudge particles. The liquid-like intermediate product is then blended with a plurality of pieces of ice. The duration of the blending is sufficient to eliminate all large ice pieces and provide a relatively smooth and flowable iced frozen fudge drink having grains of ice. In the first blending step, there may be added a thickener/emulsifier, some cocoa, some sugar and some creamer. A one step variant combines all constituents, including water and ice in a single blending stage that provides a flowable drink having small bits of fudge.

8 Claims, No Drawings

FROZEN FUDGE DRINK

BACKGROUND OF THE INVENTION

This invention relates to a frozen fudge drink and technique of making the drink. Frozen drinks such as smoothies and coladas are well known. The term "frozen drink" is generally used to mean an icy treat or the like which is close to ice cold and has appreciable viscosity yet is liquid enough to drink.

Fudge is one of the more popular candies, particularly at resorts and theme parks. There are often shops in which fudge is the leading candy shown and in which the making of fudge is demonstrated to the public. The enormous popularity of fudge has lead to the presentation of fudge in a wide variety of flavors, shapes and colors.

In spite of the long history of frozen drinks and the long history of fudge consumption, no one has provided a frozen drink essentially based on fudge.

Accordingly, the major purpose of this invention is to provide a novel frozen fudge based drink. A related purpose of this invention is to provide a technique of manufacturing this novel frozen drink made from fudge as its essential ingredient.

It is a further object of this invention to provide the above mentioned product using a technique readily employed at the store from which the product is sold without requiring expensive or cumbersome equipment.

BRIEF DESCRIPTION

In brief, a frozen fudge drink is created in a two stage blending process employing a mechanical blender. In the first stage, a predetermined amount of fudge is chopped into pieces and added to a predetermined relatively small amount of water. This combination is blended to provide an intermediate liquid product. A substantial amount of ice is added to the intermediate product and a blending process is undertaken to provide a drinkable end product which readily flows, is smooth to the palate and devoid of large ice particles, yet contains grains of ice to provide a frozen mouth feel. For example, one-quarter of a pound of fudge and five fluid ounces of water are blended for 20 seconds and then approximately ten ounces by weight of ice cubes are added and blended for about 20 seconds to provide a yield of 18 fluid ounces for use in providing a 16 ounce drink.

In a preferred embodiment, where a chocolate flavor based fudge is used, about two ounces of a mix containing such ingredients as cocoa, creamer, sugars and xanthan gum are added in the first stage to provide a smoother end product.

A variant drink combines all constituents, including water and ice, in a single blending stage which provides a flowable drink having small bits of fudge.

DESCRIPTION OF THE PREFERRED EMBODIMENTS

The frozen fudge drink of this invention is developed in a two-stage blending process.

In the first stage, a predetermined amount of fudge is blended with a predetermined amount of water to provide a smooth intermediate product having no significant fudge particles.

In the second stage, ice cubes are added and the blending continued until a smooth end product is provided.

More particularly, in one embodiment of the invention, a one-quarter pound piece of fudge is cut from a slab of fudge. It is cut into a number of smaller pieces, for example, four pieces. The fudge pieces and approximately five fluid ounces of water are put into a blender. A Vita-Mix two-speed, two-step blender Model No. VM0100A is used. The time in the blender is set at twenty seconds and the lever actuated. The result is a blender that will automatically blend at a lower speed (approximately 14,000 RPM) for ten seconds and then ramp up to a high speed of (approximately 37,000 RPM) for ten seconds. The blender will then shut off automatically after twenty seconds. This provides the intermediate product. Experience shows that a substantially larger drink size employing more fudge will require a few seconds more. But by no means is the additional time proportional to the size of the drink. The object of this stage is to get a uniform flowable mixture as an intermediate product.

In this embodiment, ten ounces by weight of ice cubes are added to the first stage blend. The blender is actuated a second time with the timer set at twenty seconds thereby providing the same two-speed blending. The result is a yield of approximately 18 fluid ounces adequate to provide a customer's drink in a 16 ounce cup.

In a preferred embodiment, a powder mix may be added in the first stage to obtain certain modified characteristics which will generally be desirable.

For example, where chocolate flavor fudge is used, cocoa in the mix makes for a more chocolately flavor. Xanthan gum in the mix assures that fat will not separate out. Creamer in the mix provides a richer taste. Sugars in the mix provide greater body and enhanced mouth feel. The amounts of these additional constituents is a function of user preference for the end product.

It should be understood that as used herein the term "frozen" in the phrase "frozen fudge drink" refers to a cold somewhat viscous type of drink. This usage is the practice in the industry. The term does not refer to a solid state.

Various types of ice cubes can be used as shown in the tables herein. Some degree of experimentation as to the length of the second blending stage has to be undertaken as a function of the blender used and the size of the ice cubes employed.

A larger or smaller size in the product drink can be obtained by appropriate scaling of the fudge and the amount of ice as indicated in the tables at the end of the disclosure. The charts show the results of various combinations of fudge by weight and of ice cubes by weight to provide a yield adequate for standard size drinks.

Blending has to be sufficient so that a relatively smooth drink is obtained. It is preferable, however, that the second stage blending be stopped at a point where grains of ice remain in the final product to be eaten by the consumer. These grains of ice provide a generally desirable iced feel to the palate.

The frozen fudge drink provided has a consistency that flows enough so that one can readily drink it through a 3/16 inch straw. Yet, it is viscous enough to support a straw inserted into the end product. The product provided is not viscous enough to form a peak. It is a liquid that lies substantially flat.

As can be seen from the tables, the amount of water added in the first stage increases slightly as the amount of fudge is increased for a larger size serving. It has been found that this reduces the likelihood, in the second blending step, of the ice cubes creating what is known as a cavitation effect. However, if the ice cubes clump together so as to prevent the blending from proceeding, the user may have to use a spatula to distribute the larger pieces of ice inside the blender container and restart the blending. The tables are set forth at the end of the specification.

Table I shows embodiments without the powder mix. Table II shows embodiments with the powder mix.

In a preferred embodiment, an additional minor component of a mix of powders is provided to achieve certain refinements which are often desirable. The additional ingredients provided by this powder mix are listed below.

First, there is a small amount of xanthan gum which is a thickener and appears to serve the purpose of preventing separation of fat from the rest of the drink. As is known in the art, the amount added is very small.

If a somewhat stronger chocolate flavor is desired, a small amount of additional cocoa is added to provide that flavor. The amount added is a function of taste.

A creamer constituent provides a somewhat more creamy taste and can be added in a quantity that is a function of the creaminess of the taste desired. Creamer constituents can include non-fat dry milk, corn syrup solids and coconut oil.

In addition, products such as sugar, dextrose and maltodextrin can be added to provide a somewhat greater body and enhanced mouth feel.

It should be understood that the amounts of the additional constituents, which are added in the first mixing stage, can be varied to provide a desired change or refinement in the strength of chocolate flavor, creamy effect and body or texture. In general, the amount of xanthan gum added is the amount necessary to prevent the separation of fat.

Certain variations in the above mix and procedure can be undertaken, by experimentation, to provide the same result. For example, alternate blenders and blending time can be used. Each blender, will require some experimentation as to blending speeds and times to achieve a comparable product.

For example, the powder mix used in one preferred embodiment contained about 75% sugar, about 10% cocoa, about 4.5% each of non-dairy creamer and maltodextrin. It contained only 0.1% xanthan gum as that was sufficient to attain the blending result desired without fat separation. These constituents can be varied and/or omitted to provide a desired end product.

A significant variation on the process and in the end product can be obtained through a one step procedure in which all of the constituents, including fudge, water and ice (and the powder mix if desired) are put together initially in a blender and blended for between thirty seconds and sixty seconds. The result is a product which includes bits of fudge. It is flowable but the bits of fudge provide a drink that is not smooth. It is preferable that the blending be stopped at the point where grains of ice remain in the drink so as to provide the iced drink feel.

Two tests of this variant drink that have been made incorporated one quarter of a pound of fudge, five fluid ounces of water and ten ounces by weight of ice cubes.

In one test, the blender was run for 15 seconds at the lower speed (about 14,000 RPM) and 15 seconds at the higher speed (about 37,000 RPM). In a second test, the blender was run at the higher speed for 60 seconds. Both procedures resulted in a drink having bits of fudge small enough to pass through a 3/16 inch diameter straw with no large pieces of fudge. The water is necessary to assure that the large chunks of fudge will be processed into small bits. The ice causes the bits to become solid or hard enough to resist further blending. In both tests, there were grains of ice.

TABLE I

WATER, FUDGE & ICE

| Drink Cup "Size" (fl. oz.) | Fudge Weight (oz.) | Water (fl. oz.) | Ice Cubes Size | Weight (oz.) | Frozen Drink Yield (fl. oz.) |
|---|---|---|---|---|---|
| "12" | 4–5.28 | 4–5 | Rectangular (a) | 9 | 16–18 |
| "16" | 4–5.28 | 5–6 | Rectangular (a) | 11 | 17–20 |
| "20" | 5.28–6.5 | 6–7 | Rectangular (a) | 12 | 22–26 |
| "12" | 4–5.28 | 4–5 | Cylindrical (b) | 8 | 15–16 |
| "16" | 4–5.28 | 5–6 | Cylindrical (b) | 10 | 17–20 |
| "20" | 5.28–6.5 | 6–7 | Cylindrical (b) | 11 | 21–24 |
| "12" | 4–5.28 | 4–5 | Random chunks (c) | 7.5 | 14–16 |
| "16" | 4–5.28 | 5–6 | Random chunks (c) | 9 | 17–18 |
| "20" | 5.28–6.5 | 6–7 | Random chunks (c) | 10 | 20–22 |

(a) Rectangular solid (5/8" × 3/4" × 3/16")
(b) 1" × 1" cylinder with 3/8" diameter hole
(c) Random chunked ice

TABLE II

WATER, FUDGE, POWDER MIX & ICE

| Drink Cup "Size" (fl. oz.) | Fudge Weight (oz.) | Water (fl. oz.) | Powder Mix Weight (oz.) (d) | Ice Cubes Size | Weight (oz.) | Frozen Drink Yield (fl. oz.) |
|---|---|---|---|---|---|---|
| "12" | 4–5.28 | 4–5 | 1.6–2.88 | Rectangular (a) | 9 | 16.5–20 |
| "16" | 4–5.28 | 5–6 | 1.6–2.88 | Rectangular (a) | 11 | 18–22 |
| "20" | 5.28–6.5 | 6–7 | 2.88–3.84 | Rectangular (a) | 12 | 24–28 |
| "12" | 4–5.28 | 4–5 | 1.6–2.88 | Cylindrical (b) | 8 | 16–18 |
| "16" | 4–5.28 | 5–6 | 1.6–2.88 | Cylindrical (b) | 10 | 19–23 |
| "20" | 5.28–6.5 | 6–7 | 2.88–3.84 | Cylindrical (b) | 11 | 23–28 |
| "12" | 4–5.28 | 4–5 | 1.6–2.88 | Random Chunks (c) | 7.5 | 15–18 |
| "16" | 4–5.28 | 5–6 | 1.6–2.88 | Random Chunks (c) | 9 | 19–20 |

TABLE II-continued

WATER, FUDGE, POWDER MIX & ICE

| Drink Cup "Size" (fl. oz.) | Fudge Weight (oz.) | Water (fl. oz.) | Powder Mix Weight (oz.) (d) | Ice Cubes | | Frozen Drink Yield (fl. oz.) |
|---|---|---|---|---|---|---|
| | | | | Size | Weight (oz.) | |
| "20" | 5.28–6.5 | 6–7 | 2.88–3.84 | Random Chunks (c) | 10 | 22–24 |

(a) Rectangular solid (⅝" × ¾" × 3/16")
(b) 1" × 1" cylinder with ⅜" diameter hole
(c) Random chunked ice
(d) Total of cocoa, creamer, sugars and xanthan gum

What is claimed is:

1. The process of providing a frozen fudge drink comprising the steps of:
    a first step of blending a predetermined amount of a plurality of fudge pieces with a predetermined amount of water to provide an intermediate product, the amount of said water by weight being substantially within 10 percent of the weight of said fudge, and
    a second step of blending said intermediate product with a predetermined amount of a plurality of pieces of ice for a time sufficient to eliminate all large ice pieces and provide a relatively smooth and flowable iced drink, the amount of said ice by weight being substantially between 150 percent and 275 percent of the weight of said fudge.

2. The process of claim 1 wherein said relatively smooth iced drink contains grains of ice.

3. The process of claim 1 further comprising:
    in said first step, blending a predetermined amount of a powder mix containing cocoa, sugar, a creamer and an emulsifier, the amount of said powder mix by weight being substantially between 10 percent and 15 percent of the total weight of said claim 1 constituents.

4. The process of claim 3 wherein said emulsifier is xanthan gum.

5. The frozen fudge drink provided by the process of first blending a predetermined amount of a plurality of fudge pieces with a predetermined amount of water to provide an intermediate product, said amount of said water, by weight, being substantially equal to the weight of said fudge within a range of approximately 10 percent, and then blending said intermediate product with a predetermined amount of a plurality of pieces of ice for time sufficient to eliminate all large ice pieces and provide a relatively smooth and flowable iced drink, said amount of said ice by weight being substantially between 150 percent and 275 percent of the weight of said fudge.

6. The frozen fudge drink of claim 5 wherein said relatively smooth iced drink contains grains of ice.

7. The frozen fudge drink of claim 5 further comprising: in said first step, blending a predetermined amount of an emulsifier; a predetermined amount of cocoa, a predetermined amount of sugar and a predetermined amount of creamer.

8. The frozen fudge drink of claim 7 wherein said emulsifier is xanthan gum.

* * * * *